US012125609B2

(12) United States Patent
Saule

(10) Patent No.: US 12,125,609 B2

(45) Date of Patent: Oct. 22, 2024

(54) ASSEMBLY HEAD AND METHOD FOR WRAPPING A WIRE HARNESS IN AN AUTOMATED MANNER

(71) Applicant: LEONI Bordnetz-Systeme GmbH, Kitzingen (DE)

(72) Inventor: Johann Saule, Augsburg (DE)

(73) Assignee: LEONI Bordnetz-Systeme GmbH, Kitzingen (DE)

( * ) Notice: Subject to any disclaimer, the term of this patent is extended or adjusted under 35 U.S.C. 154(b) by 358 days.

(21) Appl. No.: 17/639,986

(22) PCT Filed: Aug. 14, 2020

(86) PCT No.: PCT/EP2020/072928

§ 371 (c)(1),
(2) Date: Mar. 3, 2022

(87) PCT Pub. No.: WO2021/043564

PCT Pub. Date: Mar. 11, 2021

(65) Prior Publication Data

US 2022/0293301 A1 Sep. 15, 2022

(30) Foreign Application Priority Data

Sep. 3, 2019 (DE) ..................... 10 2019 213 325.8

(51) Int. Cl.
*H01B 13/012* (2006.01)
*H01B 13/08* (2006.01)

(52) U.S. Cl.
CPC ... *H01B 13/01281* (2013.01); *H01B 13/0816* (2013.01)

(58) Field of Classification Search
CPC ..................... H01B 13/01281; H01B 13/0816
USPC .......................................................... 156/392
See application file for complete search history.

(56) References Cited

U.S. PATENT DOCUMENTS

| | | | |
|---|---|---|---|
| 3,470,057 A | 9/1969 | Stuart, Jr. et al. | |
| 4,790,896 A | 12/1988 | Schmalholz | |
| 5,525,188 A * | 6/1996 | Ingwersen ............ | H01R 43/00 29/745 |
| 5,614,042 A | 3/1997 | Nishide et al. | |
| 11,195,642 B2 | 12/2021 | Dietlein et al. | |
| 2015/0096688 A1 | 4/2015 | Word et al. | |

(Continued)

FOREIGN PATENT DOCUMENTS

| | | |
|---|---|---|
| CN | 109950003 A | 6/2019 |
| DE | 1465919 A1 | 4/1969 |
| DE | 3844159 A1 | 6/1990 |

(Continued)

*Primary Examiner* — James D Sells
(74) *Attorney, Agent, or Firm* — Laurence A. Greenberg; Werner H. Stemer; Ralph E. Locher

(57) ABSTRACT

An assembly head is used for wrapping a wire harness in an automated manner by means of a winding module. The module has a winding head which rotates about an axis of rotation and, according to a first aspect, has a total of three pressing elements with spring-mounted rollers, which, during the taping process, press a tape against the wire harness and guide the tape in a centering manner. According to a second aspect, a belt drive having a toothed belt is provided for driving the winding head. The toothed belt engages on the circumferential side only in one portion extending over a small angular range.

21 Claims, 4 Drawing Sheets

(56) References Cited

U.S. PATENT DOCUMENTS

2020/0159193 A1 5/2020 Dietlein et al.

FOREIGN PATENT DOCUMENTS

| | | | |
|---|---|---|---|
| DE | 202008004089 | U1 | 6/2008 |
| DE | 202015001990 | U1 | 5/2015 |
| DE | 202017002929 | U1 | 7/2017 |
| EP | 0270419 | A1 | 6/1988 |
| EP | 3412585 | A1 | 12/2018 |
| GB | 2141687 | A | 1/1985 |
| JP | H01117185 | A | 5/1989 |
| JP | H0710120 | A | 1/1995 |
| JP | H07157176 | A | 6/1995 |
| JP | 2017141029 | A | 8/2017 |
| WO | 9317857 | A1 | 9/1993 |
| WO | 2015055753 | A1 | 4/2015 |
| WO | 2018189102 | A1 | 10/2018 |
| WO | 2018189104 | A1 | 10/2018 |

* cited by examiner

ASSEMBLY HEAD AND METHOD FOR WRAPPING A WIRE HARNESS IN AN AUTOMATED MANNER

FIELD AND BACKGROUND OF THE INVENTION

The invention relates to an assembly head and to a method for wrapping a wire harness in an automated manner, in particular in a fully automatic manner.

In the present case, a wire harness is understood in general to be a harness-shaped structure that is preferably flexible in bending, in particular a preferably

SUMMARY OF THE INVENTION electrical wire bundle which is composed of one or more (electrical) (wire) elements. In the production of cable sets, which have a multiplicity of individual lines and frequently also a branched structure, the individual elements are frequently combined by means of banding. During the banding process, a tape, for example an adhesive tape and/or a textile tape, is wound around the wire harness.

WO 2015/055 753 A1 discloses an assembly station and a method for automatically attaching clips to a wire bundle. This assembly head has a positioning unit for positioning clips on the wire bundle, as well as in addition an adhesive tape carrier, from which an adhesive tape for securing the respective clip on the wire bundle is unrolled. During this process, the adhesive tape is guided around the wire bundle in the manner of banding. In this assembly station, with the banding, a further element, in particular a clip, is additionally secured at the same time.

EP 3 412 585 A1 discloses a winding device for wrapping a wire harness with an adhesive tape. Here, the winding device has a winding head which has an annular segment with an insertion opening for the wire bundle to be wrapped. The annular segment has a receiving space for the wire bundle. The latter is inserted into the receiving space and, in the process, is first guided at the inlet of the insertion opening by guide elements, which are designed, for example, as rollers. During the insertion of the wire bundle, an adhesive tape arranged in front of the insertion opening is taken along, which tape is placed around the wire bundle as it is passed through by the guide elements. In the receiving space, the wire bundle is then guided by pivoting jaws, which press the adhesive tape against the wire bundle during a subsequent rotation of the winding head, with the result that the adhesive tape is wound around the cable bundle during the rotation. The winding head is rotated by means of a belt drive, which is guided over the circumferential side of the winding head.

Such an assembly head is preferably used in a system for automated cable set production, as described, in particular, in WO 2018/189102 A1, specifically in a fixing station or distribution station of such a system, as disclosed, for example, in WO 2018/1891 04 A1, and in which banding is to be applied around a cable bundle.

Proceeding therefrom, the object underlying the invention is that of enabling reliable wrapping of a wire harness, in particular of a wire bundle, in an automated, in particular fully automatic, manner.

The object is achieved by means of an assembly head having the features of as claimed and furthermore by means of a method having such an assembly head.

In general, the assembly head is used for wrapping a wire harness extending in a transverse direction with a tape in an automated manner, in particular in a fully automatic manner. In addition to the transverse direction, the assembly head itself also extends in a longitudinal direction and in a vertical direction. It has a winding module with a winding head, which is rotatable about an axis of rotation extending in the transverse direction. Furthermore, a drive for rotating the winding head and a tape feed for feeding the tape are formed. The tape is, in particular, an adhesive tape and/or a textile tape.

Furthermore, the winding head itself has an annular segment having a central winding space. The annular segment has a lateral insertion opening for the lateral insertion (transversely to the transverse direction) of the wire harness into the winding space. The annular segment furthermore has a circumferential side and can be rotated about the axis of rotation. Furthermore, the winding head has a plurality of pressing elements, which can be moved in the radial direction against the wire harness, thereby being pressed against the latter. These pressing elements are secured on the annular segment. During operation, they press a tape fed via the tape feed against the wire bundle, with the result that, during rotation of the winding head, the tape is pressed against the wire harness by the pressing elements, and banding takes place. In this case, at least and preferably exactly three pressing elements with resiliently mounted rollers are provided. In this case, the pressing elements with the rollers are designed in such a way that, during operation, that is to say during the rotation of the winding head, they on the one hand press the tape against the wire harness by means of the at least three rollers and on the other hand also center the wire bundle or guide or hold it in a centered manner within the annular segment or winding space. The (three) rollers therefore bear against the wire harness during the rotation of the winding head (with the tape to be applied interposed).

The three resiliently mounted rollers are therefore pressed against the wire bundle by means of a spring force. For resilient mounting, the rollers are resiliently mounted, for example, on the respective pressing element. Alternatively, the pressing elements themselves are resiliently mounted. The interaction of the three rollers is of particular importance in that they guide the wire bundle in the center of the winding space. A good winding result is thus achieved.

Apart from the pressing elements with the rollers, it is preferred that no further guide elements for the tape be provided on the rotatable winding head. In particular, the tape is guided on the winding head exclusively by the rollers. The rollers are all arranged inside the winding space. They therefore receive the wire harness between them only after the latter has been inserted through the insertion opening into the winding space.

In comparison with the known winding head, as disclosed in EP 3 412 585 A1, therefore, there is no need for two separate guiding devices, namely, on the one hand, the guide elements (rollers) arranged at the inlet of the insertion opening and the pivoting jaws pivoting therefrom into the center of the winding space. Rather, all three guide rollers lie in the central region of the winding space and exert a centering force on the wire bundle, ensuring that the latter is reliably held in a central position during the winding process.

In the case of at least some of the pressing elements, in particular in the case of two pressing elements, the respective roller of the respective pressing element is held on two arms. In this arrangement, the two arms are connected to one another in an articulated manner in the region of the roller. In this case, an articulation axis coincides, in particular, with an axis of the rollers, about which said rollers can preferably be rotated. The two arms are each supported on the annular segment by their other ends, the ends remote from the roller. The pressing elements are therefore designed in the manner of an articulated lever with two lever arms, which are connected to one another via the roller. In this arrangement, the ends arranged on the annular segment are arranged opposite one another, i.e. one end is secured in the region of the insertion opening of the annular segment and the other end is secured in a rear partial region of the annular segment which lies opposite the insertion opening. In this case, the end secured in this rear partial region is arranged at least approximately centrally.

As already mentioned, two pressing elements arranged opposite one another and designed in the manner of articulated levers are provided. Here, the two rear ends are, in particular, arranged directly adjacent to one another, for example only in a rear angular range (angular spacing) of at most 45° and preferably of at most 30°. In contrast, the front ends of these pressing elements, which are arranged in a front partial region of the annular segment, are arranged with a larger front angular range than the rear ends, in particular in each case in an edge region which is preferably directly adjacent to the insertion opening. This front angular range is, for example, at least twice as large as the rear angular range. It is, for example, between 60° and 100°. Overall, a continuous guide structure, which begins at the insertion opening and tapers in an initial state, is thereby formed. This guide structure automatically guides the wire harness in the direction of the center when the wire harness is inserted into the winding space. By virtue of the resilient mounting of the rollers, adaptation to different diameters of the wire harness is provided at the same time.

One, front arm, which is therefore secured in the front partial region of the annular segment, that oriented toward the insertion opening, when viewed in the longitudinal direction, is therefore designed overall as an insertion element which, in the initial state, extends obliquely from the respective edge of the insertion opening into the winding space. By means of this insertion element, the wire harness is reliably inserted into the winding space. The two opposite insertion elements therefore form or are part of the guide structure tapering in the direction of the axis of rotation. In the present case, the initial state is understood to mean the no-load state when there is no wire harness in the winding space.

The respective insertion element, that is to say the front arm of the pressing element, is preferably mounted movably on the annular segment. For this purpose, the insertion element has, in particular, an elongate hole, through which, for example, a bolt secured on the annular segment passes. This movable mounting of one end of the insertion element makes possible a compensating movement, thus enabling wire harnesses of different diameters to be received and held and guided in a centered manner without any problems.

The pressing elements, which are designed in the manner of an articulated lever, are preferably supported resiliently against the annular segment. For this purpose, a spring element, in particular a leg spring, acting on the rear arm is preferably arranged in each case.

In a preferred embodiment, the third pressing element and the third roller are arranged in a resiliently mounted manner in a rearward region of the winding space, remote from the insertion opening, and thus of the annular segment. All three rollers can be moved in the radial direction (in the direction outward with respect to the annular segment) against the spring force.

Overall, the three rollers, when viewed in a plane perpendicular to the transverse direction, span a kind of triangle and, when the wire harness is inserted, rest against the latter over a circumferential range of preferably at least 180° or in a range around 180° (for example 170° to 190°). At least in an initial state, the three rollers are arranged at a 12 o'clock, 6 o'clock and 9 o'clock position, for example.

In this arrangement, the three rollers are resiliently mounted independently of one another.

According to a second aspect, the object is achieved according to the invention by means of an assembly head having the features as claimed. This second aspect is preferably combined with the first aspect, namely the embodiment with the three guide rollers.

According to the second aspect, provision is made for the drive to have a belt-shaped drive element, such as a chain, but preferably a (toothed) belt or even a simple belt. To drive the annular segment, the drive element runs along the circumferential side of the annular segment, the drive element resting against the circumferential side only sectionally in a respective section. Here, the respective section extends only over an angular range of <45° and, in particular, over an angular range of 15° to 30°.

In a preferred embodiment, the drive element rests against the circumferential side in at least two, preferably exactly two, sections spaced apart from one another. In this case, the winding head and the annular segment are driven by the belt, preferably in positive engagement.

In comparison with the belt drive known from EP 3 412 585 A1, which rests on the winding head over more than 180°, the belt-shaped drive element described here, especially the toothed belt, makes contact over a significantly smaller continuous sectional region. Particularly in the case of the preferred use of a toothed belt drive, reliable, in particular offset-free, engagement of the individual teeth of the belt and the annular segment is thereby ensured. Because of the insertion opening and the noncircular design which results therefrom, an offset occurs between the teeth of the belt and those of the annular segment during the rotation of the winding head, leading to nonoptimal engagement.

In a preferred embodiment, the angular range over which the respective section extends is smaller than an opening angle over which the insertion opening extends. This ensures that the section in contact does not extend across the insertion opening, and therefore there is no risk of a mismatch, where the teeth do not reliably engage in one another.

In an expedient embodiment, at least two sections, and preferably exactly two sections, spaced apart from one another, are formed, and these rest against the circumferential side. Reliable guidance is thereby achieved overall.

Overall, contact of the drive element (belt) which is as far as possible only tangential is preferably provided in order to exclude an offset as far as possible. The section in contact therefore extends at least approximately along a tangential line. At the engagement locations, this is achieved over only a small angular range of, for example, up to 20° or up to 30°. In this case, preferably only a few teeth, for example 3 to 8 teeth, of the toothed belt engage in corresponding teeth of the annular segment.

For each section, at least two, preferably exactly two, guide elements, which form a guide pair and are, in particular, designed in the manner of pulleys, are provided for the circulating drive element.

Furthermore, in an expedient embodiment, a deflection element is arranged between the two guide pairs, which are spaced apart from one another in the circumferential direction, and the belt-shaped drive element is guided along the rear side, that is to say on the side facing away from the annular segment, by means of said deflection element. This reliably ensures that the belt-shaped drive element does not rest against the annular segment in the region between the guide pairs.

In an expedient embodiment, the winding module furthermore has a tape collector, which has a gripping unit for gripping a tape end, in particular a loose tape end, of the tape. In this case, the gripping unit can be moved, in particular pivoted, across the insertion opening by means of the tape collector. This is understood to mean that a movement can be carried out by means of the belt collector, with the result that—when viewed in the vertical direction—the gripping unit can be moved, in particular pivoted, from a position above the insertion opening into a position below the insertion opening. During operation, therefore, the tape end is gripped and then as it were pulled across the insertion opening. When the wire bundle is inserted into the winding space, the tape is then automatically inserted into the winding space at the same time and, in the process, also already comes to rest against the wire bundle.

In this case, the gripping unit is, in particular, arranged on a bracket which can be pivoted about a pivot axis.

Here, the tape collector, in particular the pivoting movement, can be controlled in such a way that different drawn-off tape lengths can be set, that is to say a tape length provided for the respective winding operation is set.

The winding module furthermore preferably has a cutting unit for cutting through the tape, wherein the cutting unit can be pivoted about a further, preferably vertical, pivot axis and has a cutting element, which is moved to an increasing extent against the tape as a result of the pivoting movement. A genuine cutting movement with successive severing of the tape by the cutting element is thereby ensured.

The winding module itself is furthermore secured on a guide unit of the assembly head and can be moved in the longitudinal direction for the purpose of executing a feed movement. This makes it possible for the winding module, especially the winding head, to be fed in in the longitudinal direction with respect to the wire harness.

In a preferred embodiment, the assembly head furthermore has, in addition to the winding module, at least one fixing module for fixing the wire harness. This ensures that, during the banding operation, the wire harness, in particular the wire bundle, is held stationary and taut/tensioned. The wire bundle is preferably held taut with a certain tensile stress between two fixing modules. Here, the fixing module is arranged adjacent to the winding module in the transverse direction. In particular, a fixing module is arranged on both sides of the winding module.

In a preferred embodiment, a further module, in particular a clip module, is designed for positioning a clip on the wire harness. When viewed in the transverse direction, this is preferably positioned directly adjacent to the winding module. In particular, two winding modules are provided, between which the further module (clip module) is arranged. In this embodiment, the clip is fixed on the wire harness with the aid of the two winding modules and by the banding applied by the latter. A preferred embodiment of the clip module is described, for example, in the application simultaneously filed by the applicant with the title “Clip module for positioning a clip at a predetermined assembly position of a wire harness and assembly head having such a clip module”.

In a preferred embodiment, the assembly head furthermore has a swivel joint, which extends along the longitudinal direction and by means of which the assembly head can be swung open in two parts. In particular, for example, one winding module can be swung down in each case. Better accessibility, for example for inspection purposes or for the purpose of replenishing the adhesive tape, etc., is thereby achieved.

The assembly head can furthermore be moved in space by means of an adjusting device, especially by means of a robot, in particular by means of a multi-axis articulated arm robot. During operation, for example, the assembly head is brought up to a wire harness to be banded, then the winding head moves in the feed direction, preferably together with the entire winding module, with the result that the wire harness penetrates into the winding space before the actual banding is subsequently carried out by the rotation of the winding head. In general, the winding head is preferably arranged fixedly on the winding module and moves together with the latter in and counter to the feed direction, which corresponds to the longitudinal direction.

The object is furthermore achieved by a method for wrapping a wire harness in an automated manner by means of an assembly head of the kind described above.

Here, the essential method steps for wrapping the wire harness in an automated manner are as follows:

- the tape is pulled across the insertion opening by means of the tape collector,
- the wire harness is inserted into the winding space in the longitudinal direction, in particular by a feed movement of the winding module, during which process the tape comes to rest against the wire harness and the guide rollers yield against the spring force,
- the winding head and thus the guide rollers subsequently rotate about the axis of rotation, wherein the tape is wound around the wire harness as they do so,
- the wire harness is held in a centering manner by the pressing elements during rotation in the center of the winding space and does not perform any movement of its own,
- preferably before the start of rotation, the tape is cut off with the cutting unit.

This cycle may be repeated several times, with the result that the wire harness is provided with banding at different positions. Specifically, the winding module is used for automatic banding of a wire bundle in a system for automated cable set production, in particular in a fixing station or distribution station of the kind described in WO 2018/189104 A1 or WO 2018/189102 A1.

In a preferred embodiment, a further element, in particular a clip, is secured on the wire harness by means of this described banding operation. For this purpose, prior to the actual banding, the clip module is used to bring a clip up to the wire harness before this, more specifically at least one fastening leg of the clip, is then wrapped with the tape.

In this case, this further element, in particular clip, is preferably supplied individually at a supply position. The winding head travels to this supply station, in particular with the aid of the robot mentioned, in order to grasp the clip supplied. The assembly head then moves to an assembly position, where the wire harness is supplied, in order then first to position the clip on the wire harness and subsequently to secure the clip by means of the banding.

In an expedient development, the assembly head is enclosed by a protective sheath, in which only the elements which come into direct contact with the cable set during operation are accessible. This avoids a situation where parts of the wire harness/cable set get stuck on the assembly head during operation.

BRIEF DESCRIPTION OF THE FIGURES

An exemplary embodiment of the invention is explained in greater detail below with reference to the figures. More specifically.

In the figures, parts which act in the same way are provided with the same reference signs.

DETAILED DESCRIPTION OF THE INVENTION

Figure 1:
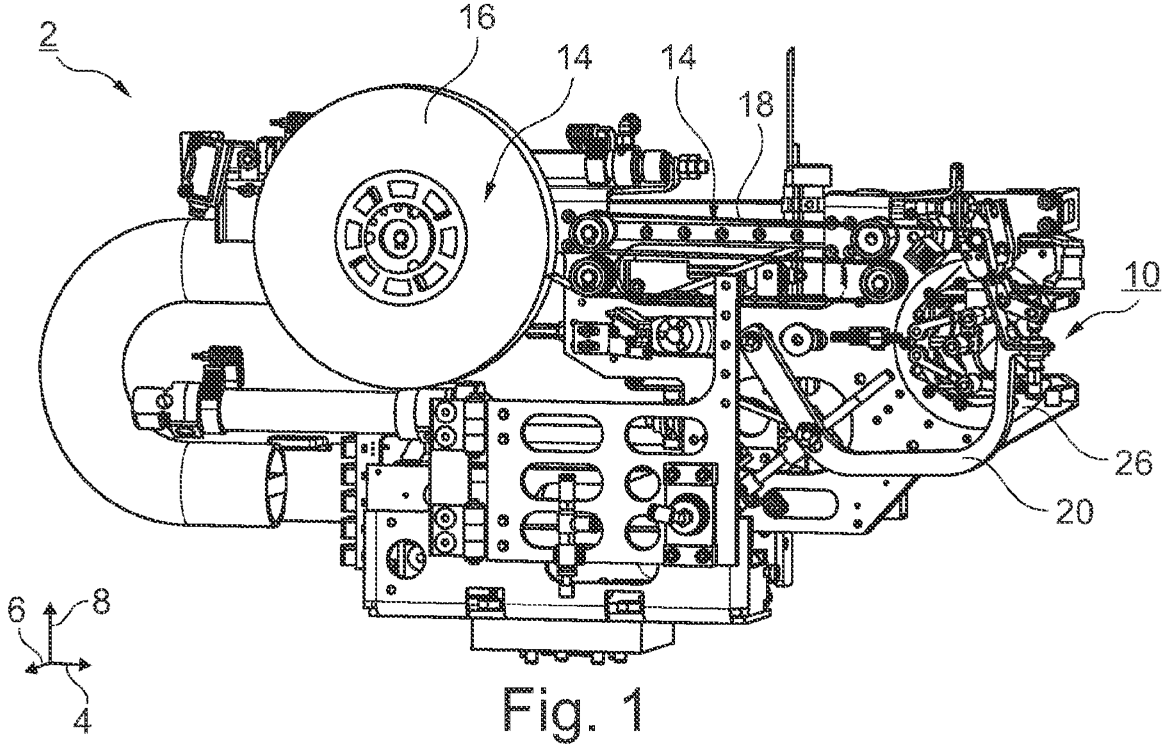
FIG. 1 shows a side view of a winding module in the direction of view of a winding side with sprung rollers.
Figure 2:
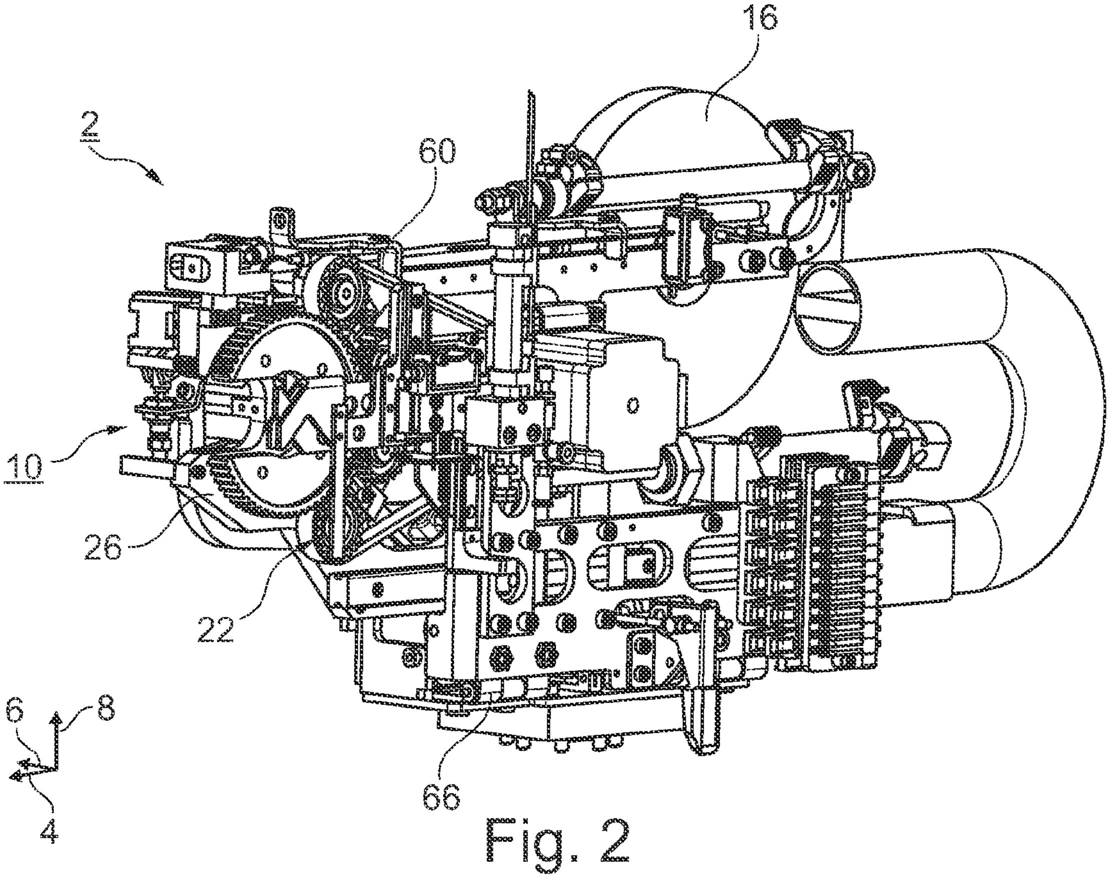
FIG. 2 shows a side view of the winding module according to FIG. 1 in the direction of view of a drive side.
Figure 6:
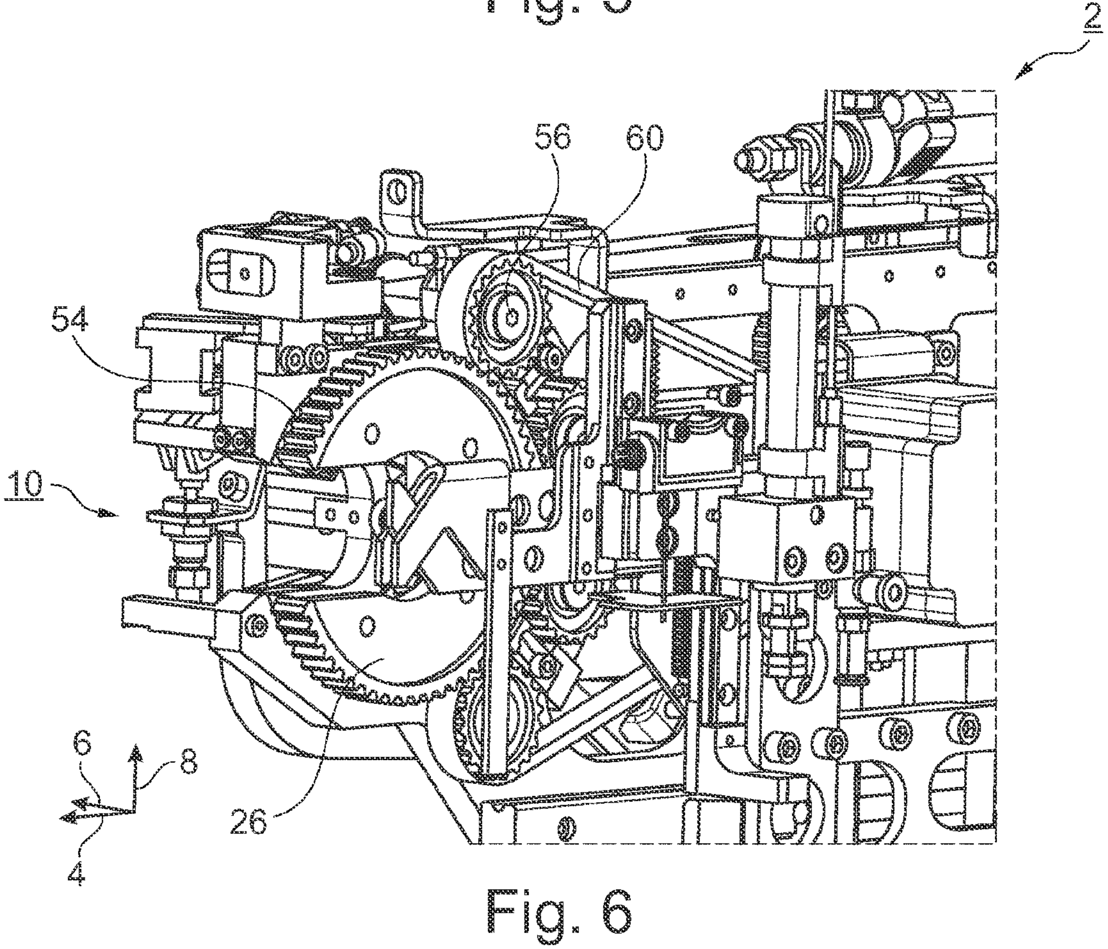
FIG. 6 shows an enlarged perspective illustration in the direction of view of the drive side.
Figure 7:
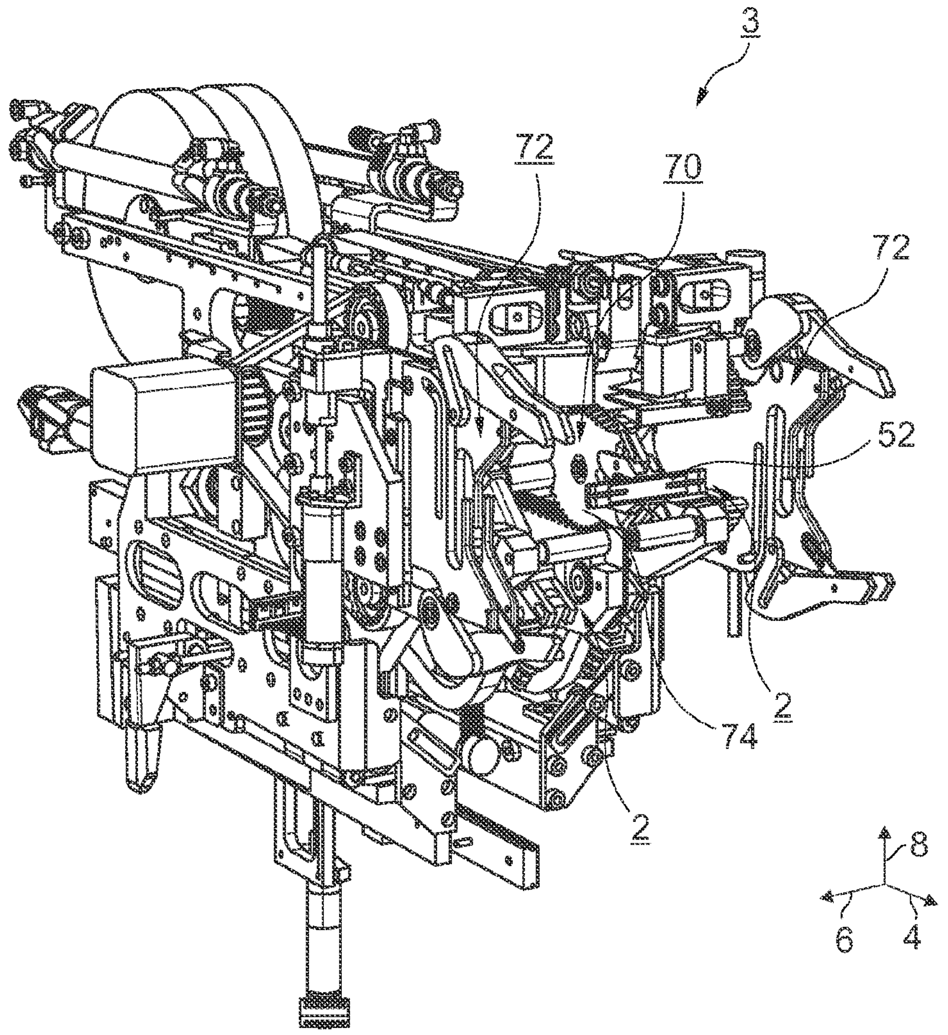
FIG. 7 shows a perspective illustration of an assembly head having a plurality of modules.

As illustrated, the winding module 2 illustrated in FIGS. 1 and 2 is preferably part of an assembly head 3 illustrated in FIG. 7. In principle, the winding module 2 can also be used as the sole module. FIGS. 1 to 6 illustrate partial regions and sections of the assembly head 3, with different components being masked out in the figures to enable the structure and function of individual partial elements to be recognized and explained better. In this case, the winding module 2 is in each case illustrated in an initial position before a banding operation is carried out.

The winding module 2 as well as the assembly head 3 generally extend in a longitudinal direction 4, in a transverse direction 6 as well as in a vertical direction 8. A plurality of components and units are arranged on a supporting frame of the winding module 2 and also of the assembly head 3.

Figure 4:
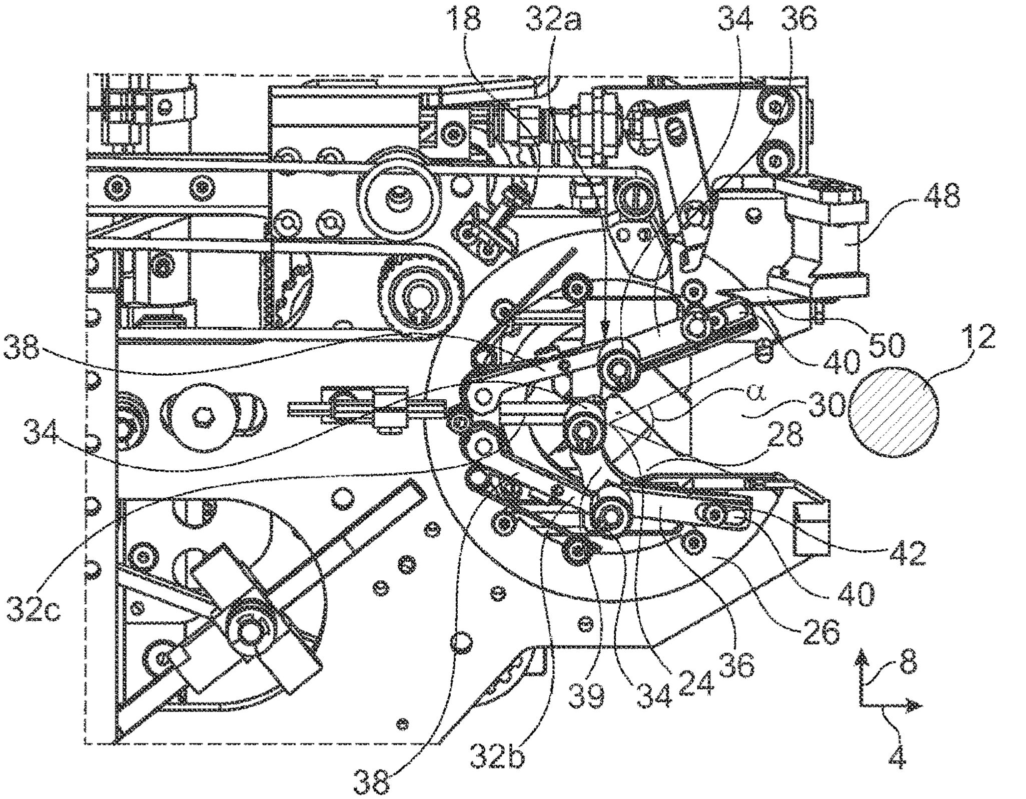
FIG. 4 shows a further view, comparable to FIG. 3, of the winding head.

In the case of the winding module 2 illustrated in FIGS. 1 and 2, a winding head 10 is arranged at the front end, as viewed in the longitudinal direction 4, which is designed to apply banding to a wire harness 12 (cf. FIG. 4). Here, the wire harness 12 extends in the transverse direction 6.

Furthermore, the winding module 2 has a tape feed 14, which contains a tape roll 16, on which a tape 18, in particular an adhesive tape, is wound, which is used for the banding. The tape feed 14 has a plurality of guide and deflection elements for the tape 18 as well as, in addition, a tape collector 20.

The winding head 10 is rotatably arranged and can be driven by means of a drive 22 (FIG. 2).

The construction and operation of the winding head 10 for applying the banding to the wire harness 12 will be explained below with reference to FIGS. 3 and 4 as the first essential aspect. The construction and operation of the drive 22 will be explained with reference to FIGS. 5 and 6 as the second essential aspect.

Figure 3:
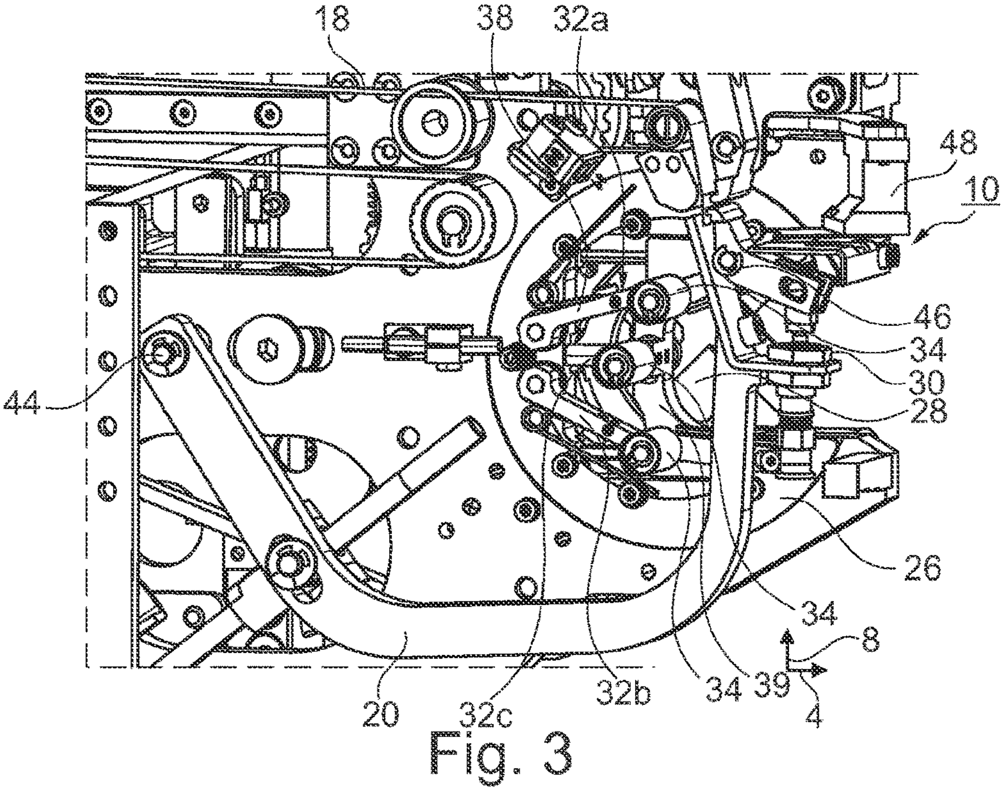
FIG. 3 shows an enlarged illustration of the view according to FIG. 1 in the region of a winding head with the guide rollers.

As can be seen from FIGS. 3 and 4, the winding head 10 comprises an annular segment 26 mounted rotatably about an axis of rotation 24. The latter has a central open winding space 28, which is open toward an edge side, with the result that an insertion opening 30 is formed. FIGS. 3 and 4 show a view of the side of the winding head 10 in the direction of view opposite to the transverse direction 6. This side of the winding head 10 is referred to as the winding side.

Figure 5:
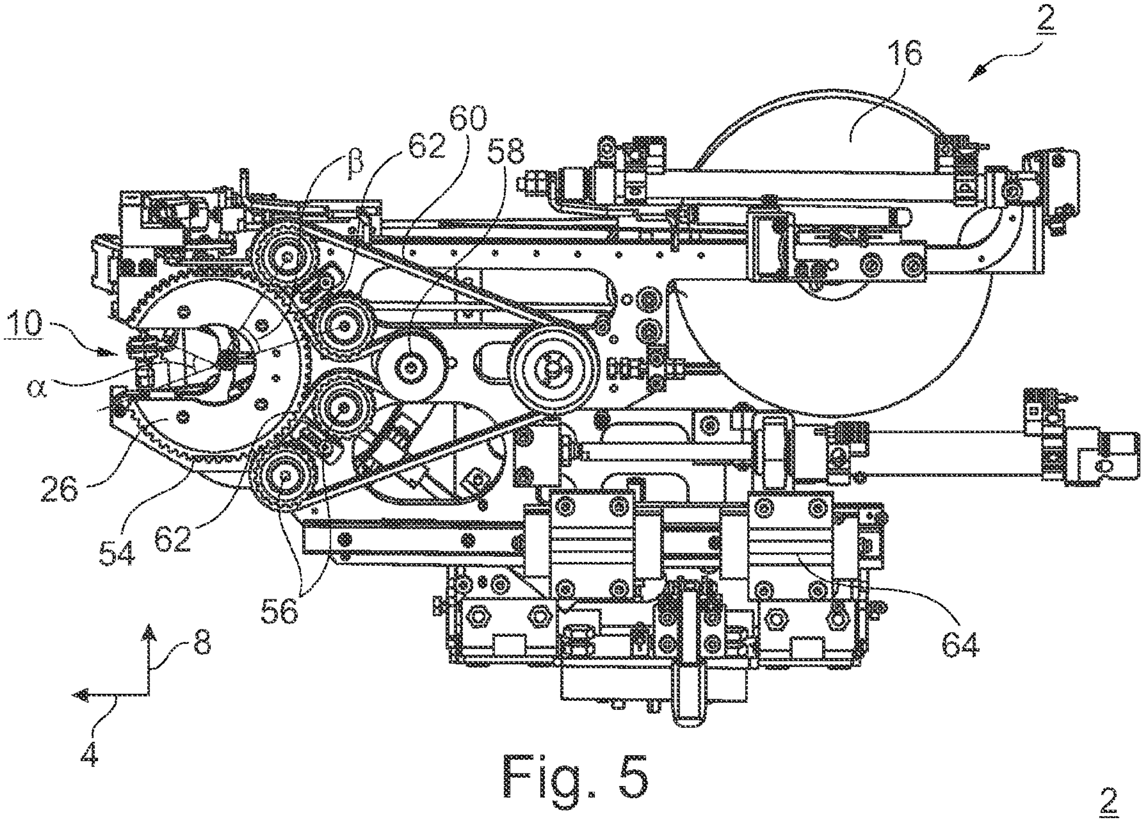
FIG. 5 shows a side view of the drive side to illustrate the drive.

FIGS. 5 and 6, in contrast, show a view of the winding head and of the drive in the direction of view of the transverse direction 6. This side of the winding head 10 is also referred to as the drive side.

A total of three pressing elements 32*a,b,c*, each having a roller 34, are formed on the annular segment 26. The respective pressing element 32*a,b,c* is in each case mounted resiliently on the annular segment 26, and therefore the rollers 34 are resiliently mounted overall.

Two of the pressing elements 32*a,b* are designed in the manner of articulated levers and have two arms 36, 38 which are connected to one another in an articulated manner in the region of the respective roller 34. Here, the front arm, which is oriented toward the insertion opening 30 in the longitudinal direction 4, simultaneously defines an insertion element 36. The opposite arm, which faces away from the insertion opening 30, is referred to below as the rear arm 38. The rear arms 38 of the two pressing elements 32*a*, 32*b* are secured on the annular segment 26 in a region opposite the insertion opening 30 and have at their fastening points only a small angular spacing of at most 45° and preferably of at most 30°.

In contrast, the front arms forming the insertion elements 36 are secured on the annular segment 26 adjacent to the insertion opening 30. Here, they are mounted in a manner that allows a sliding movement in order to permit length compensation. For this purpose, the insertion elements 36 each have an elongate hole 40, into which a fastening bolt 42 engages. The angular spacing of the two fastening bolts is significantly greater than the angular spacing of the fastening points of the rear arms 38 and is in the range of 60° to 100°, for example. The insertion opening 30 generally has an opening angle $\alpha$. This is sufficiently large for wire harnesses 12 of different diameters to be inserted into the winding space 28. The opening angle is, for example, 40° to 60° or up to 90°.

The special design and arrangement of the pressing elements 32*a,b* makes it possible to insert the wire harness 12 reliably and safely. A continuous guide structure is formed. When viewed in a transverse plane perpendicular to the transverse direction 6, said structure defines, particularly in combination with the third pressing elements 32*c*, a continuous, gap-free boundary of a receiving space for the wire harness 12, which is open only toward the insertion opening 30. This prevents the wire harness to be inserted from being fed in incorrectly and, for example, from entering a spatial region between the rollers 34 and the annular segment 26.

The third pressing element 32*c* is arranged in the rear region of the winding space 28. In this case, the associated roller 34 is resiliently supported along a guide, especially a linear guide. In this case, the guide comprises a further arm 39, which extends transversely to the two pressing elements 32*a,b* in the form of articulated levers and, for example, in the vertical direction 8. This further arm 39 crosses (in a plane offset in the transverse direction) the pressing elements 32*a,b*, in particular their rear arms 38. As a result, the receiving space for the wire harness 12 is also closed toward the rear. The two opposite end regions of the further arm 39 are preferably guided in a linear guide.

In this case, the direction of movement for the resilient compensating movement of the roller 34 of this third pressing element 32*c* is oriented in the direction from the axis of rotation 24 to the region between the two fastening points of the rear arms 38 (or counter to the longitudinal direction 4).

FIG. 3 additionally includes the tape collector 20. In the exemplary embodiment, this is designed in the manner of a bracket which can be pivoted about a pivot axis 44 and is of approximately U-shaped design, for example. Here, the pivoting movement, in particular the size of the pivoting angle, can be set by means of an adjusting unit. A desired length of the tape 18 can thereby be set.

At its front end, the tape collector has a gripping unit 46, by means of which the tape 18 can be gripped with a clamping action.

Furthermore, FIGS. 3 and 4 show a cutting unit 48, which is mounted so as to be pivotable about a vertical axis and has a knife-like cutting element 50. To cut the tape 18, the cutting unit 48 is pivoted against the tape 18 and successively cuts through the latter, resulting in a pulling cut.

The cutting unit 48 is arranged above the insertion opening 30 when viewed in the vertical direction 8. It therefore cuts through the tape 18 above the insertion opening 30. In this position, a loose end of the tape 18 is gripped by the gripping unit 46.

Here, the operation of the winding head 10 for carrying out the banding is as follows:

After a preceding cycle, the winding head 10 is in the initial position illustrated in FIG. 3. The loose end of the tape 18 is gripped by means of the gripping unit 46. By means of a pivoting movement of the tape collector 20, the tape 18 is pulled downward, in particular counter to the vertical direction 8, with the result that—as viewed in a projection counter to the transverse direction—the tape extends across the insertion opening 30.

In the next step, the wire harness 12 is inserted into the winding space 28. During this process, the tape 18 previously pulled down is taken along and fits snugly against one side of the wire harness 12 as it is inserted into the winding space 28. The wire harness 12 is guided into the center of the winding space 28, preferably in such a way that the axis of rotation 24 coincides with the longitudinal axis of the wire harness 12. During this process, the resiliently mounted rollers 34 yield and are pressed against the wire harness 12 with the spring force. As a result of the configuration of the three resiliently mounted rollers, the wire harness is therefore held overall in a centering manner within the winding space 28. Here, the rollers 34 touch the tape 18 and press it against the circumferential surface of the wire harness 12. After the wire harness 12 has been inserted into the winding space 28, the tape 18 is cut off by means of the cutting unit 50. Subsequently, the entire winding head 10 is rotated, with the result that the tape is successively laid around the wire harness by means of the rollers 34. The tape 18 is wound several times around the wire harness 12. After completion of the winding process, the wire harness 12 is moved out of the winding space 28 again. The insertion and removal of the wire harness 12 is preferably accomplished by means of a movement of the winding head 10, preferably together with the entire winding module 2, which is movable in and counter to the longitudinal direction 4. During this process, the wire harness 12 is preferably fixed in position.

The winding module 2 is also particularly suitable for securing further elements, such as a clip 52 (cf. FIG. 7, for example), on the wire harness 12. Clips 52 of this type typically have fastening legs which extend along the wire harness 12 and rest on it. In the region of such a fastening leg, the wire harness 12 is therefore typically no longer circular but noncircular. In such applications too, reliable banding is ensured by the resiliently mounted rollers 34.

In the exemplary embodiment, the drive 22 that can be seen in FIGS. 5 and 6 is designed as a toothed belt drive. The annular segment 26 has a toothed circumferential side 54, which is necessarily interrupted in the region of the insertion opening 30. The annular segment 26 is therefore designed in the manner of a toothed belt pulley or has at least one such toothed belt pulley.

The drive 22, which is constructed in the manner of a belt drive unit, has a drive pulley, a plurality of guide elements constructed in the form of guide pulleys 56 and a deflection element constructed in the form of a deflection pulley 58. Two adjacent guide pulleys 56 each define a guide pair, and the deflection pulley 58 is arranged between the two guide pairs. A belt-shaped drive element, which is designed as a toothed belt 60 in the exemplary embodiment, is guided around these pulleys.

Here, a respective guide pair defines a section 62, in the region of which the toothed belt 60 rests against the annular segment 26 and engages in the toothed circumferential side 54. In this case, the respective section 62 extends over a comparatively small angular range β, which in the exemplary embodiment is approximately 45°.

In this case, the angular ranges α, β as well as other angular ranges indicated here are each defined by an angular range with reference to the axis of rotation 24. In the case of the section 62, the angular range β is defined by the angular spacing between the two axes of rotation of the guide pulleys 56. Here, the angular range β is, in particular, smaller, for example by 5° to 10°, than the opening angle α of the insertion opening 30.

The comparatively short engagement length of the toothed belt 60 in a respective section 62 ensures that the teeth of the toothed belt 60 and those of the toothed circumferential side 54 engage in one another reliably and without offset. This ensures reliable, trouble-free operation.

During the winding process, the annular segment 26 rotates several times about the axis of rotation 24. Owing to the insertion opening 30 and the associated noncircular circumferential side of the annular segment 26, this would lead to an offset occurring in the case of large sections 62 and the teeth of the toothed belt 60 would no longer reliably engage in the toothing of the annular segment 26 and would therefore possibly run tooth to tooth.

With reference to FIG. 5, it can also be seen that the winding module 2 is secured on a guide unit 64, by means of which a feed movement in and counter to the longitudinal direction 4 is made possible. The entire winding module 4 can therefore be adjusted relative to the support frame. For this purpose, a corresponding feed drive and, for example, a suitable linear guide, especially a guide rail, are provided.

A further aspect can be seen from FIG. 2:

The winding module 2 itself can be swung open in two parts in a lower region by means of a swivel joint 66 about a pivot axis extending in the longitudinal direction 4. As a result, improved access is made possible, for example, either for replacing the tape roll 16 or else for maintenance purposes.

FIG. 7 illustrates an illustrative embodiment of the assembly head 3 in which the winding module 2 described above is accommodated. In the case of this assembly head 3, a plurality of modules is arranged directly adjacent to one another in the transverse direction 6. In the exemplary embodiment, two winding modules 2 are arranged on both sides of a central center module. In this case, this center module is designed as a clip module 70, which is designed to position the clip 52 on the wire harness 12. In addition to the two winding modules 2, a respective fixing module 72, by means of which the wire harness 12 is fixed, is arranged on the outside in each case. The fixing module 72 is used to hold the wire harness 12 by clamping, and for this purpose has suitable fixing elements, for example in the form of adjustable clamping arms.

In a preferred embodiment, the winding module 2 is used, together with at least one fixing module 72, preferably with fixing modules 72 arranged in each case on both sides of the winding module 2, as a common assembly head 3 without further modules, in particular without a clip module 70, for example in order to provide a (loose) wire bundle with banding.

The entire assembly head 3 is preferably secured on an adjusting device which can move the assembly head 3 in space. This is, in particular, a robot. Here, the entire process cycle for banding and securing the clip 54 is, for example, as follows:

The assembly head 3 is moved to a supply station, at which clips 52 are supplied individually. A respective clip 54 is gripped by means of the clip module 70. The assembly head 3 moves to an assembly position at which the wire harness 12 is supplied. Here, the assembly head 3 is oriented in such a way that its transverse direction 6 coincides with the longitudinal direction of the wire harness 12. The clip 54 is positioned by means of the clip module 70 at a desired position (angular position) on the circumferential side of the wire harness 12 and held in this position. For this purpose, the clip module 70 has a gripper 74 of corresponding design, which is of very narrow construction. Its width in the transverse direction 6 is, for example, only in the range between 10 and 30 mm. The winding modules 2 are arranged directly adjacent to this very narrow clip module 70. The two winding heads 10 are fed in in the longitudinal direction 4, with the result that they are guided over the wire harness 12 and the latter lies in the respective winding space 28. Banding then takes place. By means of the banding, the two fastening legs of the clip 52 are wrapped together with the wire harness 12, and thus the clip 52 is secured on the wire harness 12. The gripper 74 then releases the (now fixed) clip 52, and the clip module 70 as well as the winding modules 2 are returned to the initial position counter to the longitudinal direction 4. A new cycle begins.

LIST OF REFERENCE SIGNS

2 winding module
3 assembly head
4 longitudinal direction
6 transverse direction
8 vertical direction
10 winding head
12 wire harness
14 tape feed
16 tape roll
18 tape
20 tape collector
22 drive
24 axis of rotation
26 annular segment
28 winding space
30 insertion opening
32*a,b,c* pressing element
34 rollers
36 insertion element/front arm
38 rear arm
39 further arm
40 elongate hole
42 fastening bolts
44 pivot axis
46 gripping unit
48 cutting unit
50 cutting element
52 clip
54 circumferential side
56 guide pulley
58 deflection pulley
60 toothed belt
62 section
64 guide unit
66 swivel joint
70 clip module
72 fixing module
74 gripper
α a opening angle
β angular range

The invention claimed is:

1. An assembly head extending in a longitudinal direction, a transverse direction and a vertical direction, and being configured for automatically wrapping a transversely extending wire harness, the assembly head comprising:
a winding module with
a winding head rotatably mounted about an axis of rotation extending in the transverse direction;
a drive for rotating the winding head;
a tape feed for feeding a tape;
said winding head including
an annular segment having a central winding space and a lateral insertion opening for inserting the wire harness into the winding space, and having a circumferential side, wherein the annular segment is rotatable about an axis of rotation;
a plurality of adjustable pressing elements movably mounted against the wire harness and secured on said annular segment;
said tape feed being configured for feeding a tape, to be pressed against the wire harness by said pressing elements during an operation and during a rotation of said winding head;
said drive having a belt-shaped drive element which runs along the circumferential side of said annular segment in order to drive said annular segment, said belt-shaped drive element resting against the circumferential side only sectionally in a respective section, and said section extending over an angular range of less than 90°.

2. The assembly head according to claim 1, wherein:
said plurality of pressing elements are at least three pressing elements with resiliently mounted rollers, and said at least three pressing elements are configured to press the tape against the wire harness and to guide the tape in a centering manner.

3. The assembly head according to claim 2, wherein, in at least some of said pressing elements, the respective roller is held on two arms, which are connected to one another in an articulated manner at the roller and are supported by respective other ends on said annular segment.

4. The assembly head according to claim 3, wherein one of said arms is secured in a partial region of said annular segment which is at the front when viewed in the longitudinal direction and is oriented toward the insertion opening, and wherein said one arm is configured as an insertion element.

5. The assembly head according to claim 4, wherein said insertion element is one of two oppositely disposed insertion elements.

6. The assembly head according to claim 4, wherein said insertion element is movably mounted on said annular segment for adapting to different diameters of the wire harness.

7. The assembly head according to claim 2, wherein said rollers include a third roller arranged in a resilient manner in a rearward region of the winding space, remote from said insertion opening.

8. The assembly head according to claim 1, wherein the angular range over which said section extends lies in a range 30° to 45°.

9. The assembly head according to claim 1, wherein the angular range over which said section extends is smaller than an opening angle over which said insertion opening extends.

10. The assembly head according to claim 1, wherein said drive element rests against the circumferential side in at least two sections that are spaced apart from one another.

11. The assembly head according to claim 10, wherein at least two guide elements, which form a guide pair, are provided for said drive element of the respective section of said at least two sections.

12. The assembly head according to claim 11, which comprises a deflection element, along which the drive element is guided, arranged between said two guide pairs.

13. The assembly head according to claim 1, wherein said winding module further comprises a tape collector having a gripping unit for gripping the tape, wherein said gripping unit is movable across said insertion opening.

14. The assembly head according to claim 13, wherein said tape collector is controllable to set a tape length for a winding operation.

15. The assembly head according to claim 1, wherein said winding module further includes a cutting unit for cutting through the tape, said cutting unit being pivotable and having a cutting element which is moved to an increasing extent against the tape as a result of a pivoting movement in order to carry out a cutting movement.

16. The assembly head according to claim 1, wherein said winding module is secured on a guide unit and said winding module is movable in the longitudinal direction for executing a feed movement.

17. The assembly head according to claim 1, which comprises, in addition to said winding module, at least one fixing module for fixing the wire harness, said fixing module being arranged adjacent said winding module in the transverse direction.

18. The assembly head according to claim 1, wherein said winding module is one of two winding modules, and wherein a further module is arranged between said two winding modules in the transverse direction, said further module being a clip module for positioning a clip on the wire harness.

19. The assembly head according to claim 1, which comprises at least one swivel joint, which extends along the longitudinal direction and by means of which the assembly head can be swung open in two parts.

20. A method for automated wrapping of a wire harness, the method which comprises:

providing an assembly head according to claim 1;

inserting the wire harness, which extends in a transverse direction relative to the assembly head, into the winding space of the assembly head and winding a tape around the wire harness.

21. The method according to claim 20, which comprises the following method steps:

pulling the tape across the insertion opening by way of tape collector;

inserting the wire harness into the winding space, wherein the tape comes to rest against the wire harness and the guide rollers yield against a biasing spring force;

rotating the winding head about the axis of rotation to wind the tape around the wire harness; and cutting the tape off with a cutting unit of the assembly head.

* * * * *